US012371934B2

(12) United States Patent
Trummer et al.

(10) Patent No.: US 12,371,934 B2
(45) Date of Patent: Jul. 29, 2025

(54) HINGE FOR DOOR OR WINDOW

(71) Applicant: ROTO FRANK FENSTER—UND TÜRTECHNOLOGIE GMBH, Leinfelden-Echterdingen (DE)

(72) Inventors: Hannes Trummer, Pirching (AT); Robert Hopfer, Hausmannstaetten (AT); Andreas Schmidt, Maria Lankowitz (AT); Peter Riznik, Tillmitsch (AT)

(73) Assignee: ROTO FRANK FENSTER—UND TUERTECHNOLOGIE GMBH, Leinfelden-Echterdingen (DE)

( * ) Notice: Subject to any disclaimer, the term of this patent is extended or adjusted under 35 U.S.C. 154(b) by 29 days.

(21) Appl. No.: 18/276,024

(22) PCT Filed: Mar. 16, 2022

(86) PCT No.: PCT/EP2022/056860
§ 371 (c)(1),
(2) Date: Aug. 24, 2023

(87) PCT Pub. No.: WO2022/194950
PCT Pub. Date: Sep. 22, 2022

(65) Prior Publication Data

US 2024/0117659 A1 Apr. 11, 2024

(30) Foreign Application Priority Data

Mar. 17, 2021 (AT) .............................. A 50043/2021

(51) Int. Cl.
*E05D 7/04* (2006.01)
*E05D 3/02* (2006.01)
(Continued)

(52) U.S. Cl.
CPC ................ *E05D 3/02* (2013.01); *E05D 5/06* (2013.01); *E05D 7/0027* (2013.01);
(Continued)

(58) Field of Classification Search
CPC ....... E05D 7/04; E05D 7/0423; E05D 7/0415; E05D 7/043; E05D 7/0027; E05D 7/0045;
(Continued)

(56) References Cited

U.S. PATENT DOCUMENTS

| | | | | |
|---|---|---|---|---|
| 5,150,500 A * | 9/1992 | Bisbing | E05D 7/04 16/265 |
| 6,276,025 B1 * | 8/2001 | Leibman | E05D 5/06 16/241 |

(Continued)

FOREIGN PATENT DOCUMENTS

| | | | | |
|---|---|---|---|---|
| CN | 203626469 U * | 6/2014 | |
| EP | 2186980 A | 2/2011 | |
| EP | 3670801 A1 * | 6/2020 | E05D 5/14 |
| JP | 08193452 A * | 7/1996 | |
| WO | 2000/066863 A | 11/2000 | |

*Primary Examiner* — Chuck Y Mah
(74) *Attorney, Agent, or Firm* — Andrew Wilford

(57) ABSTRACT

A hinge for a panel or window has a frame subassembly having a frame leaf mountable on a fixed frame and a substantially cylindrical bushing fixed to the leaf and centered on an axis, a panel subassembly having a leaf mountable on the panel of the door and a flange fixed to the leaf, and a hinge-pin assembly pivotally interconnecting the frame and panel subassemblies and having a hinge pin rotatable in the bushing and a part fixed to an end of the hinge pin and having a seat slidably receiving the flange. An adjuster moves the flange in the seat in the hinge-pin subassembly in a transverse direction normal to the axis of the hinge-pin subassembly. A clamping block is slidable in the transverse direction in the part of the hinge-pin assembly. A connecting element secures the clamping block to the hinge-pin subassembly and can slide in the flange.

7 Claims, 2 Drawing Sheets

(51) Int. Cl.
*E05D 5/06* (2006.01)
*E05D 7/00* (2006.01)
*E05D 11/00* (2006.01)

(52) U.S. Cl.
CPC ........ *E05D 7/0045* (2013.01); *E05D 11/0054* (2013.01); *E05D 2007/0036* (2013.01); *E05Y 2201/11* (2013.01); *E05Y 2201/696* (2013.01); *E05Y 2600/12* (2013.01); *E05Y 2600/502* (2013.01); *E05Y 2900/132* (2013.01); *E05Y 2900/148* (2013.01)

(58) Field of Classification Search
CPC .... E05D 3/02; E05D 5/06; E05D 5/12; E05D 11/0054; E05D 2007/0438; E05D 2007/0446; E05D 2007/0453; E05D 2007/0461; E05D 2007/0476; E05D 2007/0484; E05D 2007/0492; E05D 2007/0036; E05Y 2201/11; E05Y 2201/696; E05Y 2600/12; E05Y 2600/502; E05Y 2900/20; E05Y 2900/132; E05Y 2900/148
See application file for complete search history.

(56) References Cited

U.S. PATENT DOCUMENTS

| | | | | |
|---|---|---|---|---|
| 6,757,938 | B1 * | 7/2004 | di Vinadio | E05D 7/0054 16/245 |
| 2008/0104798 | A1 * | 5/2008 | Hoppe | E05D 7/0027 16/236 |
| 2008/0307606 | A1 * | 12/2008 | Karlsson | E05D 7/0423 16/245 |
| 2011/0041288 | A1 * | 2/2011 | Pacini | E05D 7/0045 16/244 |
| 2015/0135480 | A1 * | 5/2015 | Bartels | E05D 7/04 16/237 |
| 2016/0047151 | A1 * | 2/2016 | Pelekanos | E05D 11/0054 16/237 |
| 2016/0060930 | A1 * | 3/2016 | Bacchetti | E05D 11/0054 16/241 |
| 2016/0201369 | A1 * | 7/2016 | Criddle | E05D 7/0045 16/238 |
| 2017/0247920 | A1 * | 8/2017 | Dolman | E05D 7/04 |
| 2017/0362867 | A1 * | 12/2017 | Friz | E05D 5/023 |
| 2020/0024879 | A1 * | 1/2020 | Lu | E05D 7/0423 |

* cited by examiner

HINGE FOR DOOR OR WINDOW

CROSS REFERENCE TO RELATED APPLICATIONS

This application is the US-national stage of PCT application PCT/EP2022/056860 filed 16 Mar. 2022 and claiming the priority of Austrian patent application GM50043/2021 itself filed 17 Mar. 2021.

FIELD OF THE INVENTION

The invention relates to a hinge for a door or window having a frame subassembly mountable on a fixed frame and having a leaf and a substantially cylindrical bushing, a panel subassembly mountable on the panel of the door or window and having a leaf and a flange, a hinge-pin assembly pivotally interconnecting the frame and panel assemblies arranged one above the other in the vertical direction in the assembled state and having a hinge pin insertable into the bushing and having a part at the opposite end and having a seat for the flange, the flange being adjustable perpendicular to the direction of the longitudinal axis of the hinge-pin subassembly via an adjusting means within the seat in the hinge-pin subassembly.

PRIOR ART

Door hinges configured as roller hinges include a frame subassembly and a panel subassembly, each of the two subassemblies having a leaf and a part in communication with an axle member. The assemblies can be screwed to the frame and the panel inside respective mortises such that only the hinge-pin subassembly as well as the seats of the hinge-pin subassembly remain visible from the outside as a so-called “roller.” It is understood by the person skilled in the art that the terms “frame subassembly” and “panel subassembly” do not necessarily only include the installation state in which the frame subassembly is mounted on the frame and the panel subassembly is mounted on the panel. Depending on the application, these two parts can also be installed the other way around, or can also serve as a hinge between two panels in the case of multipanel or divided doors that are arranged in a row.

To make a fine adjustment of a leaf relative to the frame, it is further desirable to provide an adjuster in the door hinge. In the simplest case, the adjustment screws for the position of the leaf relative to the frame are located in the area of the leaves of the panel or frame subassembly. This has the disadvantage that adjustment can be performed only when the panel is open, while the correct position of the panel, however, is possibly when the panel is closed. In addition, there is an increased space requirement for the provision of the adjusters in the area of the leaves, as a result of which corresponding recesses have to be provided inside the door mortise, which leads to higher costs in the manufacture of these components and, depending on the application, is also not feasible everywhere.

In embodiments in which the adjusters are provided in the area of the hinge-pin subassembly, the advantage arises that these are accessible even when the panel subassembly is closed. However, this often results in an axis being offset between the panel subassembly and the frame subassembly, which is perceived as visually disturbing. The increased complexity in the area of the hinge-pin subassembly also often leads to a less stable design of the rotational axis and to backlash during use, which means that adjustment of the panel must be redone again and again.

WO 2000/066863 describes a hinge in the form of a roller hinge in which the transverse axial offset during fine adjustment between the frame subassembly and the panel subassembly is concealed by a slip-on sleeve connected in alignment with one of the two parts. For this to work, the cross-section of the part of the respective hinge part located inside the sleeve is reduced by the adjustment travel of the axle offset. Due to the reduced cross-section, there is also a weakening of the element in the addressed area with regard to force transmission so that the final setting is always fixed only by the adjuster itself. Adjustment over time is therefore not prevented, and it is precisely due to the increased load in this area that the panel or play within the hinge occurs over time.

In EP 2186980 a very similar hinge is described, but in which the clearance around the adjustment travel takes place within the area of the flange. Again, the final adjustment is then done by the adjuster alone, causing the problems mentioned above.

OBJECT OF THE INVENTION

Consequently, it is the object of the present invention to improve the above-described hinge to the extent that it allows adjustment possibilities within the “roll” of the hinge, that no externally visible optical axis misalignment occurs between the panel subassembly and the frame subassembly, and that the stability within the hinge is increased so that no self-adjustment or formation of play occurs. The stability and optimized power transmission between the panel subassembly and the frame subassembly should be achieved in the simplest possible way, which also keeps production costs of such a hinge low.

According to the invention, this object is achieved in that the seat for the flange holds at least one clamping block, preferably two clamping blocks, connected to the hinge-pin subassembly by respective connecting elements, each clamping block (12) having a ridge extending in a direction normal to the longitudinal axis of the hinge-pin subassembly and engaging in a complementary groove on the flange, each clamping block being movable by the connecting element between a clamping position and a freeing position. The provision of the clamping block creates a stable, play-free connection between the flange and the hinge-pin subassembly. As a result, the forces that occur do not have to be transmitted solely via the adjuster. To adjust the hinge, the clamping blocks are brought into the freeing position, which allows the flange to be adjusted within the holder via the adjuster. After adjustment, the clamping blocks are brought back into the clamping position so that further adjustment is no longer possible.

According to a preferred embodiment, it is thereby provided that the seat in the axial element has a width in the direction normal to the longitudinal axis that is wider than the flange by the transverse adjustment travel of the flange, and the adjuster is a set screw guided in a threaded bore in the flange that passes across the full width of the seat and is supported therein. In this preferred embodiment, the hinge-pin subassembly can be designed to be suitably stable and higher forces can also be absorbed by it.

As a further preferred feature, the clamping blocks also have a width substantially equal to the width of the seat, clamping screws being provided as connecting elements that connect the clamping blocks to the hinge-pin subassembly at the base of the seat. In the freeing position, the clamping blocks with their ridges also serve as guides for the flange in the adjustment direction since the ridges and respective complementary grooves run parallel to the adjustment direction of the adjuster.

In this regard, it is a further advantageous feature that a front surface of the flange as well as a surface facing it adjacent the seat and/or in the seat in the axial element are planar so that the two surfaces lie in surface contact against one another in the clamping position. This ensures a large-area, play-free connection between the flange and the hinge-pin subassembly in the clamping position. The adjuster is thus completely relieved of load in the clamping position, which also prevents unintentional adjustment.

An additional advantageous feature is that the cylindrical bushing in the frame subassembly is adjustable in height relative to the frame subassembly by an adjusting screw that is adjustable parallel to the longitudinal axis of the hinge-pin subassembly. It is advantageous also to accommodate an adjustment in the vertical direction in a simple manner in the hinge-pin subassembly.

In this context, it is further an advantageous feature that a lower cover cap is provided on the frame subassembly, covering the adjusting screw for the height adjustment, and able to be connected to the adjusting screw or the bushing via a fixing screw. The cover cap that is secured via a fixing screw simultaneously provides a counter screw for the adjusting screw that secures the latter in its set position against unwanted rotation.

Finally, it is a further preferred feature that a cover is provided in the form of a part-cylindrical tubular jacket that can be pushed on over the part of the hinge-pin subassembly having the seat for the flange, the clear width of the opening in the part-cylindrical jacket corresponding at most to the width of the seat for the flange. In principle, the solid hinge-pin subassembly means that the hinge can also be used without a slip-on sleeve, without any visible axis displacement taking place. However, to ensure that the adjusting screws and connecting elements for the clamping blocks are also not visible and protected, a cover can be provided. This cover requires only a small amount of clearance for the flange to pass through. Depending on the alignment of the flange to the hinge-pin subassembly, the cover can be twisted accordingly to enclose the hinge-pin subassembly as completely as possible.

BRIEF DESCRIPTION OF THE DRAWINGS

The invention will now be described in greater detail with reference to an example and with the aid of the accompanying figures. Therein.

WAY(S) TO CARRY OUT THE INVENTION

Figure 1:
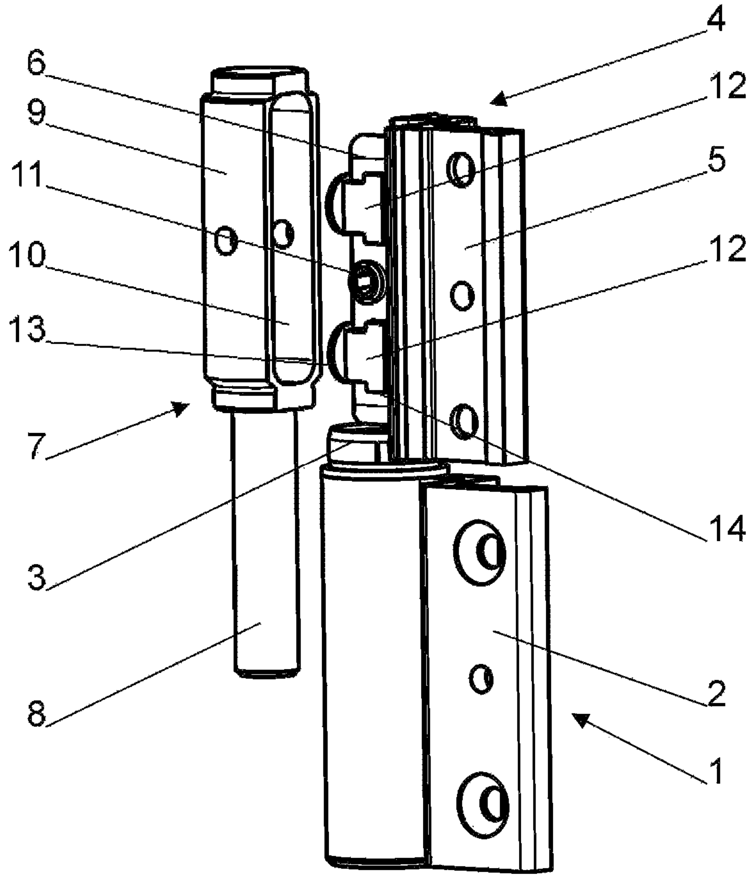
FIG. 1 is a schematic perspective view of the essential components of a hinge according to the invention.

FIG. 1 schematically shows the main elements of a hinge according to the invention. A frame subassembly 1 and a panel subassembly 4 are shown one above the other. A hinge-pin subassembly 7 is shown separately next to it for a better view. The frame subassembly 1 comprises a leaf 2 that can be mounted on the frame in a mortise and a bushing 3 held in a corresponding cylindrical part for a hinge pin 8 of the subassembly 7. The panel subassembly 4 likewise has a leaf 5 that can be mounted on the door or window panel in a mortise, as well as a flange 6 that can be inserted in a seat 10 in the upper part 9 of the hinge-pin subassembly 7. In this case, the flange 6 is designed to be thinner by an adjustment distance than the seat 10 in the hinge-pin subassembly 7.

When installed, the flange 6 can be displaced normal to the longitudinal axis of the hinge-pin subassembly 7 by an adjuster 11. Furthermore, T-section clamping blocks 12 are provided that fit with complementary grooves 14. They are aligned parallel to the displacement direction of the adjuster 11. The clamping blocks 12 are connected to the hinge-pin subassembly 7 by connecting elements 13, here in the form of screws.

The longitudinal axes of the screws, the displacement direction of the adjuster 11 and the longitudinal axis of the subassembly 7 are perpendicular to one another.

Figure 2:
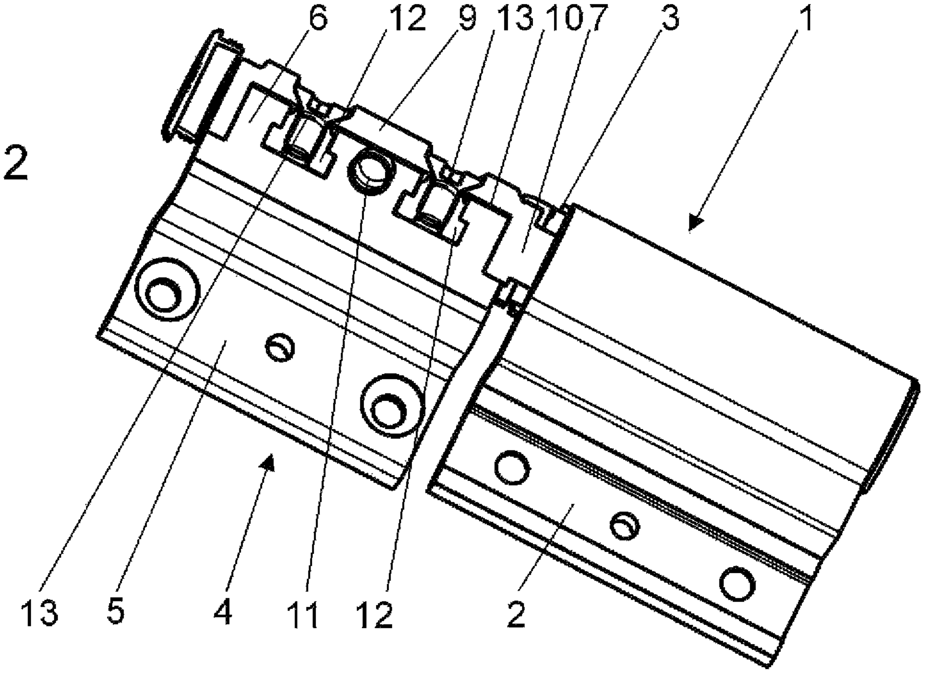
FIG. 2 is a partially sectioned view of the hinge of FIG. 1 in the assembled state.

In FIG. 2, a partially sectional view shows the assembled state. The clamping blocks 12 are held in the seat 10 in the hinge-pin subassembly 7 via the connecting elements 13. The clamping blocks 12 can be moved between a freeing position and a clamping position by loosening or tightening the connecting elements 13. In the clamping position, an end face of the flange 6 comes into surface contact with a face facing it on or in the seat 10 in the hinge-pin subassembly 7. In the view shown, this is one surface each at the top and bottom of the flange that abuts surface at the upper and lower edges adjacent the seat 10. In the freeing position, the position of the hinge can be adjusted via the adjuster 11. After the fasteners 13 have been tightened, the flange 6 is secured without play within the seat 10 and the adjuster 11 is thus relieved with respect to the transmission of forces in the hinge.

Figure 3:
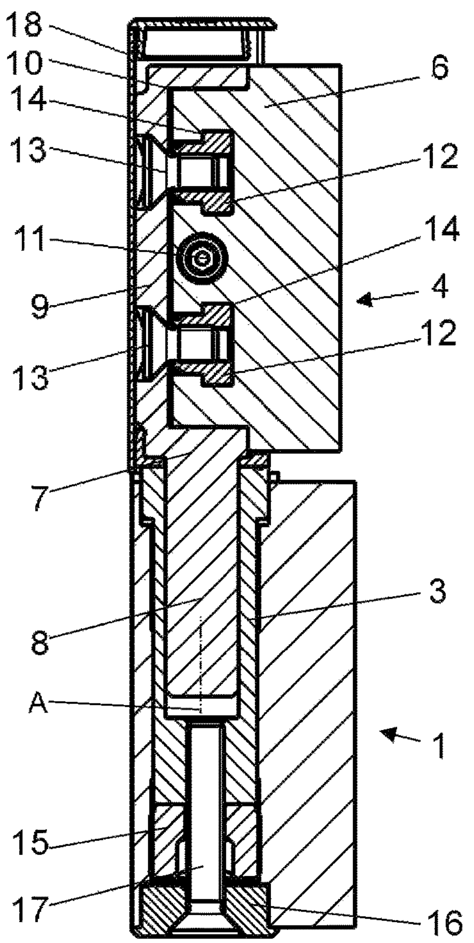
FIG. 3 is a further schematic longitudinal sectional view of a hinge according to the invention.

In FIG. 3, a further sectional view of a hinge according to the invention is shown schematically. The frame subassembly 1 holds the bushing 3 for the hinge pin 8 for axial adjustment of the hinge-pin subassembly 7. Adjustment is effected by an adjusting screw 15 accessible from below so that vertical spacing between frame subassembly 1 and panel subassembly 4 can be adjusted. To ensure that the adjusting screw 15 is also secured against undesirable rotation, a lower cover cap 16 is provided that can be connected to the bushing 3 via a fixing screw 17. The fixing screw 17 serves as a counter screw to the adjusting screw 15, since it presses the bushing 3 axially against the adjusting screw 15 and secures it in the set position. It would also be possible for the fixing screw 17 to directly counter the adjusting screw 15.

Figure 5:
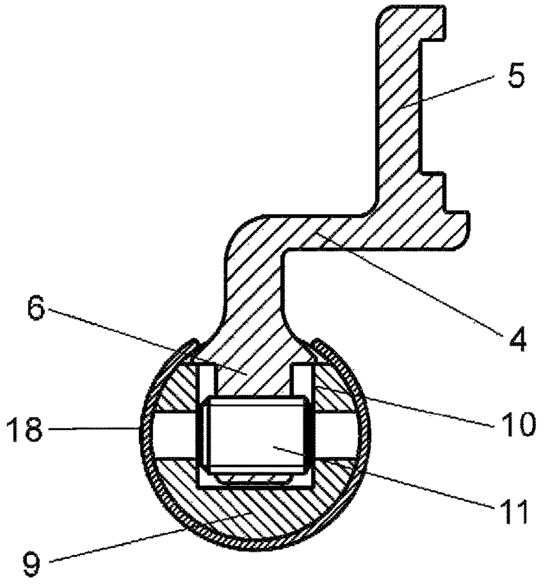
FIGS. 4 to 6 are each a cross-sectional view of a hinge according to the invention in the different setting positions.
Figure 4:
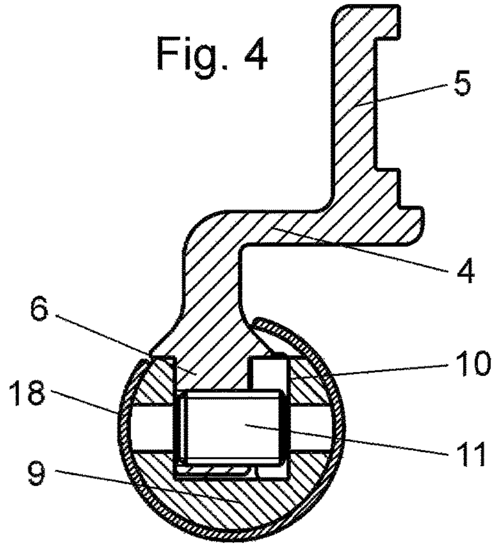
Figure 6:
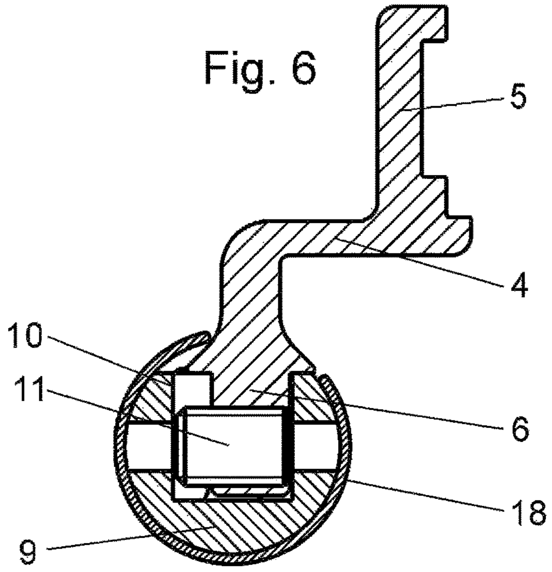

FIGS. 4 to 6 show different settings of the frame subassembly 1 with respect to the panel subassembly 4 in a schematic cross-sectional view. As can be seen, the seat 10 for the flange 6 is wider than the projecting edge of the flange 6 by the possible adjustment distance. In FIG. 4, a position is shown in which the flange 6 is shifted all the way to the left in the seat 10 via the adjuster 11. In FIG. 5, the flange 6 is located exactly in the center within the seat 10, and in FIG. 6, it is located all the way to the right. In addition to the movement by the adjuster 11 that is effected here by a worm screw extending across the seat 10, the clamping blocks 12 located in the freeing position also serve as guides for the hinge flange 6 so that it can be displaced linearly within the seat. The clamping blocks 12 are located above and below the adjuster 11, and the T-shapes of the clamping blocks as well as the T-section grooves 14 run parallel to the direction of adjustment of the adjuster 11.

A cover 18 in the form of a part-cylindrical tubular jacket is slipped over the outside of the hinge-pin subassembly 7 to cover both the adjuster 11 and the connecting elements 13 of the clamping blocks 12. Depending on the position of the flange 6, the cover 18 can be rotated accordingly to allow the passage of the flange 6.

The invention claimed is:

1. A hinge for a panel or window comprising:

a frame subassembly having a frame leaf mountable on a fixed frame and a substantially cylindrical bushing fixed to the leaf and centered on an axis, a panel subassembly having a panel leaf mountable on the panel of the door or window and a flange fixed to the panel leaf, a hinge-pin assembly pivotally interconnecting the frame and panel subassemblies and having a hinge pin rotatable in to the bushing about the axis and a part fixed to an end of the hinge pin and having a seat for slidable receiving the flange, an adjuster for moving the flange in the seat in the hinge-pin assembly in a transverse direction normal to the axis of the hinge-pin assembly, a clamping block slidable in the transverse direction in the part of the hinge-pin assembly, and a connecting element securing the clamping block to the hinge-pin assembly, the clamping block being movable in the transverse direction in a complementary groove on the flange, the clamping block being movable by the connecting element between a clamping position fixing the clamping block to the hinge-pin assembly and a freeing position.

2. The hinge for a door or window according to claim 1, wherein the seat in the hinge-pin assembly has a width in the transverse direction wider than the flange by to allow for a transverse adjustment travel of the flange in the groove, the adjuster being a set screw guided in a threaded bore in the flange and extending across and supported in the seat.

3. The A hinge for a door or window according to claim 1, wherein the clamping block is of a width the same as that of the seat, the connecting element being at least one screw that connects the clamping block s at a bottom of the seat to the hinge-pin subassembly.

4. The hinge for a door or a window according to claim 1, wherein a front surface of the flange as well as a surface facing it adjacent to the seat or in the seat in the hinge-pin assembly are planar so that the two surfaces lie flat against each other in the clamping position.

5. The hinge for a door or window according to claim 1, wherein the bushing in the frame subassembly is part cylindrical and vertically adjustable relative to the frame subassembly by an adjusting screw for height shifting the hinge pin along the axis of the hinge-pin assembly.

6. The hinge for a door or window according to claim 5, further comprising:

a lower cover cap on the frame subassembly, covering the adjustment screw for height adjustment, and connectable to the adjustment screw or the bushing via a fixing screw.

7. The hinge for a door or window according to claim 1, further comprising:

a cover in the form of a part-cylindrical tubular jacket fittable over the part of the hinge-pin assembly having the seat for the flange, a clear width of an opening in the jacket corresponding at most to the width of the seat for the flange.

* * * * *